United States Patent
Kumagai et al.

(10) Patent No.: US 9,103,678 B2
(45) Date of Patent: Aug. 11, 2015

(54) ATTACHMENT DEVICE AND TOTAL STATION (71) Applicant: Kabushiki Kaisha TOPCON, Tokyo-to (JP)

(72) Inventors: Kaoru Kumagai, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 360 days.

(21) Appl. No.: 13/735,266

(22) Filed: Jan. 7, 2013

(65) Prior Publication Data

US 2013/0174432 A1 Jul. 11, 2013

(30) Foreign Application Priority Data

Jan. 11, 2012 (JP) ................. 2012-003225

(51) Int. Cl.
*G01C 23/00* (2006.01)
*G01C 15/00* (2006.01)

(52) U.S. Cl.
CPC .............. *G01C 23/00* (2013.01); *G01C 15/002* (2013.01)

(58) Field of Classification Search
CPC ......... G01C 15/00; G01C 15/02; G01B 11/27
USPC .......................................... 33/286, 290, 227
See application file for complete search history.

(56) References Cited

U.S. PATENT DOCUMENTS

| 5,469,301 | A  | * | 11/1995 | Graham .......................... 33/293 |
| 7,243,434 | B1 | * | 7/2007 | Zucker ............................ 33/292 |
| 7,658,013 | B2 | * | 2/2010 | Tung ................................ 33/286 |
| 2009/0158604 | A1 | * | 6/2009 | Donath et al. .................. 33/285 |
| 2010/0186243 | A1 | * | 7/2010 | Schumacher .................. 33/228 |
| 2013/0174432 | A1 | * | 7/2013 | Kumagai et al. ............... 33/286 |
| 2014/0259709 | A1 | * | 9/2014 | Kumagai et al. ............... 33/290 |

FOREIGN PATENT DOCUMENTS

| CN | 2349539 Y | 11/1999 |
| CN | 1727864 A | 2/2006 |
| CN | 101776445 A | 7/2010 |
| CN | 102159921 A | 8/2011 |
| GB | 2277150 A | 10/1994 |
| JP | 1-105802 U | 7/1989 |
| JP | 6-41186 Y2 | 10/1994 |
| JP | 8-159769 A | 6/1996 |

(Continued)

OTHER PUBLICATIONS

Chinese communication dated Sep. 28, 2014 in corresponding Chinese patent application No. 201310010083.8.

(Continued)

*Primary Examiner* — Yaritza Guadalupe-McCall
(74) *Attorney, Agent, or Firm* — Nields, Lemack & Frame, LLC (57) ABSTRACT An attachment device 46 is for attaching and removing a distance measuring instrument 3 to and from an angle measuring instrument, and the attachment device comprises a base unit 61 where the distance measuring instrument is fixed, a fixing unit 55 for fixing the base unit on the angle measuring instrument, and an optical member 52 for deflecting a distance measuring light from the distance measuring instrument so as to concur with a sighting optical axis of the angle measuring instrument.

13 Claims, 6 Drawing Sheets

(56) References Cited

FOREIGN PATENT DOCUMENTS

| | | | |
|---|---|---|---|
| JP | 9-257481 | A | 10/1997 |
| JP | 3696346 | B2 | 9/2005 |

OTHER PUBLICATIONS

English translation of Chinese communication dated Sep. 28, 2014 in corresponding Chinese patent application No. 201310010083.8.

* cited by examiner

ATTACHMENT DEVICE AND TOTAL STATION

BACKGROUND OF THE INVENTION

The present invention relates to an attachment device for mounting a distance measuring instrument on an angle measuring instrument. The present invention also relates to a total station for measuring an angle of and a distance to an object to be measured.

In the fields of civil engineering and construction engineering, there have been developed and propagated a theodolite to be used as an angle measuring instrument for determining an angle of an object to be measured, an electronic distance measuring instrument to be used as a distance measuring instrument for measuring a distance to an object to be measured, and a total station used as a surveying instrument for measuring both the angle and the distance.

Among these instruments, the total station can measure angle and distance with high accuracy from an object to be measured at near distance to an object to be measured at long distance. However, the total station itself is very expensive, and high cost is required for purchasing the total station newly.

SUMMARY OF THE INVENTION

It is an object of the present invention to provide an attachment device, by which it is possible to combine the angle measuring instrument and a distance measuring instrument in simple and easy manner, and also, to provide a total station, which is arranged by using the attachment device in easy and simple manner and available at lower cost.

To attain the above object, an attachment device according to the present invention is an attachment device for attaching and removing a distance measuring instrument to and from an angle measuring instrument, and the attachment device comprises a base unit where the distance measuring instrument is fixed, a fixing unit for fixing the base unit on the angle measuring instrument, and an optical member for deflecting a distance measuring light from the distance measuring instrument so as to concur with a sighting optical axis of the angle measuring instrument.

Further, in the attachment device according to the present invention, the optical member is an optical member having at least two reflection surfaces.

Further, the attachment device according to the present invention further comprises an alignment unit to perform alignment so that the distance measuring light concurs with the sighting optical axis of the angle measuring instrument.

Further, in the attachment device according to the present invention, the alignment unit has a mechanical alignment unit for aligning by rotating the distance measuring instrument around a shaft unit having two-axis rotation shafts in horizontal direction and in vertical direction. Further, in the attachment device according to the present invention, the alignment unit has an optical alignment unit comprising a pair of wedge prisms capable of deflecting the distance measuring light in any direction as desired in a predetermined range.

Further, the attachment device according to the present invention further comprises an index mark for making an optical axis of the distance measuring light concur with the sighting optical axis of the angle measuring instrument. Further, in the attachment device according to the present invention, the base unit has an engaging projection being formed to project in inner direction and for fastening a front end of the distance measuring instrument at an upper end of a front plate having a distance measuring light projecting orifice and a distance measuring light receiving orifice, and a fixing member having a fall-stop to be moved in forward or backward direction and for fixing a rear end of the distance measuring instrument.

Further, a total station according to the present invention comprises a distance measuring instrument for projecting a distance measuring light toward an object to be measured and for measuring a distance by receiving a reflection light from the object to be measured, an angle measuring instrument for measuring an angle relating to a direction of the object to be measured by performing sighting on the object to be measured by a telescope unit, and an attachment device for attaching and removing the distance measuring instrument to and from the angle measuring instrument, and in the total station, the attachment device has an optical member for deflecting the distance measuring light from the distance measuring instrument so as to concur with a sighting optical axis of the angle measuring instrument.

Further, in the total station according to the present invention, the optical member is an optical member having at least two reflection surfaces.

Further, the total station according to the present invention further comprises an alignment unit for making the distance measuring light concur with the sighting optical axis of the angle measuring instrument. Further, in the attachment device according to the present invention, the alignment unit has a mechanical alignment unit for performing alignment by rotating the distance measuring instrument in horizontal direction and in vertical direction around a shaft unit having 2-axis rotation shafts. Further, in the attachment device according to the present invention, the alignment unit has an optical alignment unit having a pair of wedge prisms which can deflect the distance measuring light in any direction as desired within a predetermined range.

Furthermore, the total station according to the present invention further comprises a control unit, wherein the control unit makes an optical axis of the distance measuring light automatically concur with the sighting optical axis of the angle measuring instrument.

According to the present invention, an attachment device is for attaching and removing a distance measuring instrument to and from an angle measuring instrument, and the attachment device comprises a base unit where the distance measuring instrument is fixed, a fixing unit for fixing the base unit on the angle measuring instrument, and an optical member for deflecting a distance measuring light from the distance measuring instrument so as to concur with a sighting optical axis of the angle measuring instrument. As a result, it is possible to prevent measurement error caused by a deviation of an optical axis of the distance measuring light and the sighting optical axis and to improve measurement accuracy.

Further, according to the present invention, in the attachment device, the optical member is an optical member having at least two reflection surfaces. As a result, mounting of the optical member on the attachment device is easy.

Further, according to the present invention, the attachment device further comprises an alignment unit to perform alignment so that the distance measuring light concurs with the sighting optical axis of the angle measuring instrument. As a result, it is possible to perform fine adjustment of the optical axis of the distance measuring light deflected by the optical member, it is possible to eliminate the errors caused during the manufacturing process or the like and to improve the measurement accuracy.

Further, according to the present invention, in the attachment device, the alignment unit has a mechanical alignment unit for aligning by rotating the distance measuring instrument around a shaft unit having two-axis rotation shafts in horizontal direction and in vertical direction. As a result, it is possible to perform fine adjustment of horizontal angle and elevation angle of the distance measuring light.

Further, according to the present invention, in the attachment device, the alignment unit has an optical alignment unit comprising a pair of wedge prisms capable of deflecting the distance measuring light in any direction as desired in a predetermined range. As a result, it is possible to perform fine adjustment on the direction of the distance measuring light projected to the optical member.

Further, according to the present invention, the attachment device further comprises an index mark for making an optical axis of the distance measuring light concur with the sighting optical axis of the angle measuring instrument. As a result, it is possible to perform the operation in easy manner when the optical axis of the distance measuring light is adjusted so as to concur with the sighting optical axis, and to improve working efficiency.

Further, according to the present invention, in the attachment device, the base unit has an engaging projection being formed to project in inner direction and for fastening a front end of the distance measuring instrument at an upper end of a front plate having a distance measuring light projecting orifice and a distance measuring light receiving orifice, and a fixing member having a fall-stop to be moved in forward or backward direction and for fixing a rear end of the distance measuring instrument. As a result, it is possible to provide the attachment device, which is simple in construction and which can be manufactured at lower cost. Also, the distance measurement instrument can be mounted to and removed from the angle measuring instrument in easy and simple manner.

Further, according to the present invention, a total station comprises a distance measuring instrument for projecting a distance measuring light toward an object to be measured and for measuring a distance by receiving a reflection light from the object to be measured, an angle measuring instrument for measuring an angle relating to a direction of the object to be measured by performing sighting on the object to be measured by a telescope unit, and an attachment device for attaching and removing the distance measuring instrument to and from the angle measuring instrument, and in the total station, the attachment device has an optical member for deflecting the distance measuring light from the distance measuring instrument so as to concur with a sighting optical axis of the angle measuring instrument. As a result, it is possible to prevent measurement error caused by the deviation of the optical axis of the distance measuring light from the sighting optical axis and to improve measurement accuracy. Also, it is possible to manufacture a total station by mounting the distance measurement device with respect to an existing type angle measuring instrument.

Further, according to the present invention, in the total station, the optical member is an optical member having at least two reflection surfaces. As a result, mounting of the attachment device is easy.

Further, according to the present invention, the total station further comprises an alignment unit for making the distance measuring light concur with the sighting optical axis of the angle measuring instrument. As a result, it is possible to perform fine adjustment on the optical axis of the distance measuring light deflected by the optical member, to eliminate errors caused during the manufacturing process or the like and to improve measurement accuracy.

Further, according to the present invention, in the total station, the alignment unit has a mechanical alignment unit for performing alignment by rotating the distance measuring instrument in horizontal direction and in vertical direction around a shaft unit having 2-axis rotation shafts. As a result, it is possible to perform fine adjustment of horizontal angle and elevation angle of the distance measuring light.

Further, according to the present invention, in the total station, the alignment unit has an optical alignment unit having a pair of wedge prisms which can deflect the distance measuring light in any direction as desired within a predetermined range. As a result, it is possible to perform fine adjustment of the direction of the distance measuring light projected to the optical member.

Furthermore, according to the present invention, the total station further comprises a control unit, wherein the control unit makes an optical axis of the distance measuring light automatically concur with the sighting optical axis of the angle measuring instrument. As a result, it is possible to reduce working efforts and to alleviate operating procedure.

DETAILED DESCRIPTION OF THE PREFERRED EMBODIMENTS

By referring to the attached drawings, description will be given below on embodiments of the present invention.

Figure 1:
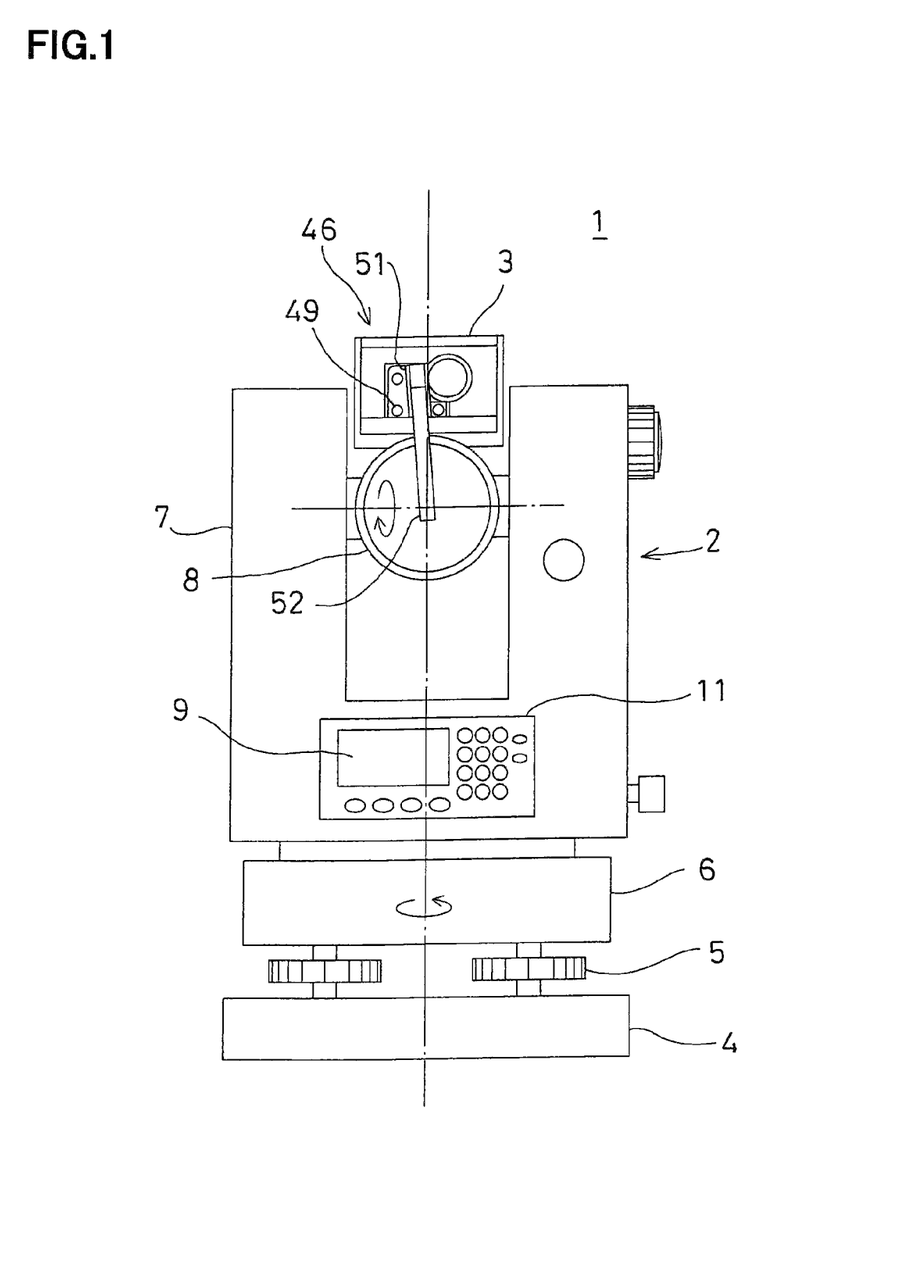
FIG. 1 is a front view of a total station according to a first embodiment of the present invention.
Figure 2:
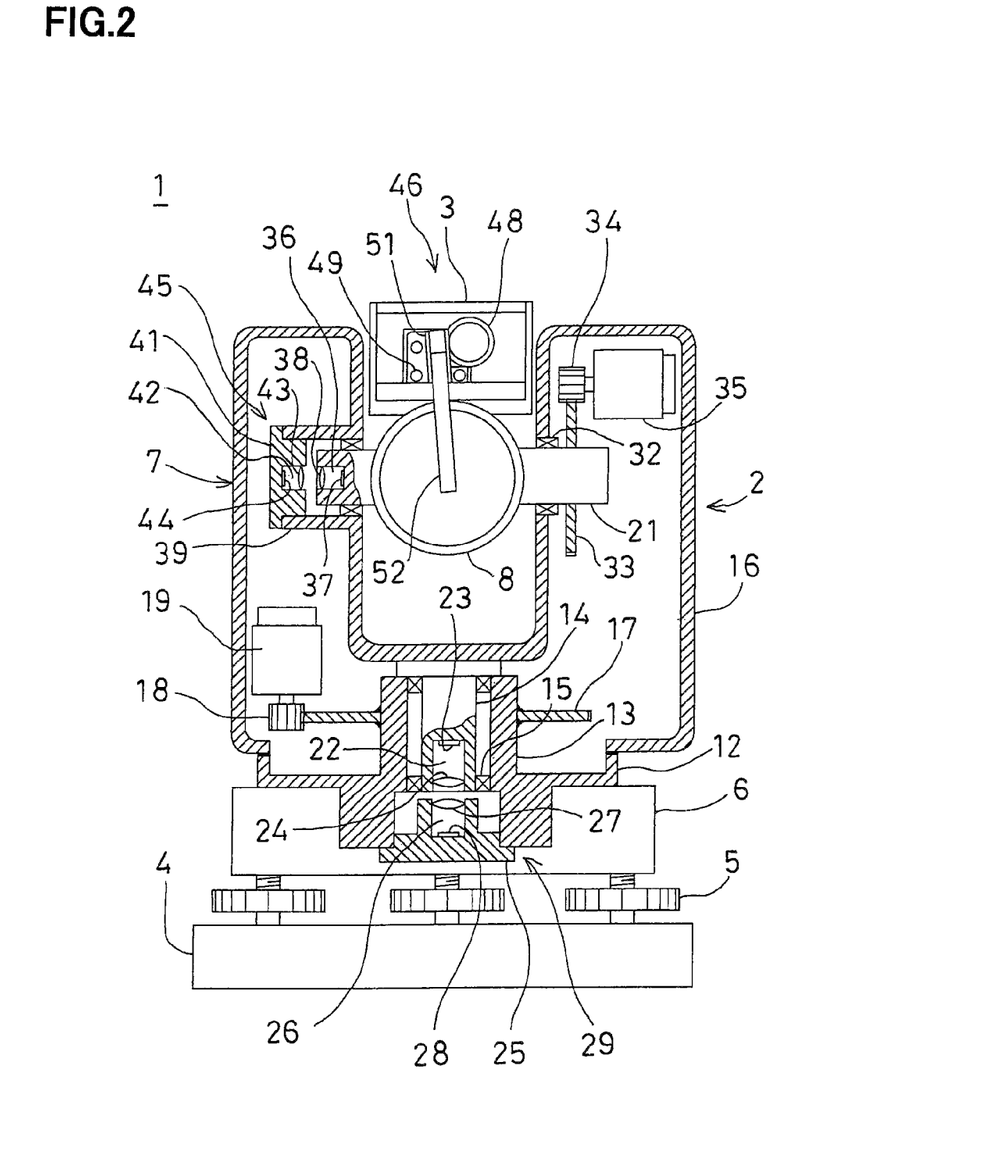
FIG. 2 is a schematical frontal cross-sectional view of the total station.

First, referring to FIG. 1 and FIG. 2, description will be given on a total station according to a first embodiment of the present invention.

A total station 1 used as a surveying instrument primarily comprises a theodolite 2, which is an angle measuring instrument, and an electronic distance measuring instrument 3, which is a distance measuring instrument mounted on the theodolite 2. First, description will be given on the theodolite 2.

A base unit 6 is disposed on a leveling unit 4 via leveling screws 5. A mount 7 is mounted on the base unit 6, and a telescope unit 8 to perform sighting on an object to be measured is supported on the mount 7.

The base unit 6 is designed so that the base unit 6 can be leveled in horizontal direction by the leveling screws 5. It is designed so that the mount 7 can be rotated around a vertical shaft center line, and that the telescope unit 8 can be rotated around a horizontal shaft center line. An operation input unit 11 having a display unit 9 is installed on the mount 7, and operating condition or a horizontal angle and a vertical angle when sighting is performed on the object to be measured by the telescope unit 8 are displayed on the display unit 9.

A frame base 12 is disposed on an upper surface of the base unit 6, and a bearing unit 13 projecting upward is mounted at the center of the frame base 12. A horizontal rotation shaft 14 is freely rotatably attached and engaged with the bearing unit 13 via a bearing 15, and a housing 16 of the mount 7 is fixedly attached to the horizontal rotation shaft 14. The frame base 12 constitutes a part of the base unit 6, which is supporting the housing 16, and the frame base 12 also fulfills the function as a lower cover, which blocks lower opening of the housing 16.

A horizontal rotation gear 17 is fixedly attached to the bearing unit 13, and a horizontal rotation driving gear 18 is engaged with the horizontal rotation gear 17. The horizontal rotation driving gear 18 is fixedly attached to an output shaft of a horizontal rotation motor 19. When the horizontal rotation driving gear 18 is rotated by the horizontal rotation motor 19, the housing 16 is designed to be rotated in horizontal direction via the horizontal rotation gear 17 with the horizontal rotation shaft 14 as a center. The horizontal rotation motor 19 is fixedly attached to the housing 16, and it is so designed that the horizontal rotation motor 19 and the housing 16 are rotated integrally.

A lower end of the horizontal rotation shaft 14 is designed to be hollow, and a first portion space 22 is formed by the hollow portion. In the first portion space 22, a horizontal angle detection pattern 23 and a horizontal first condenser lens 24 are accommodated, and the horizontal angle detection pattern 23 and the horizontal first condenser lens 24 are disposed on a center line of the horizontal rotation shaft 14. The horizontal angle detection pattern 23 is disposed at a focal position of the horizontal first condenser lens 24.

On lower surface at the center of the frame base 12, a shaft holder 25 is disposed so that a shaft center line of the shaft holder 25 concurs with the center line of the horizontal rotation shaft 14. A bearing unit space 26, which is a convex portion in cylindrical shape, is formed on the shaft holder 25 from an upper surface side. A horizontal second condenser lens 27 and a horizontal image sensor 28 are accommodated in the bearing unit space 26, and the horizontal second condenser lens 27 and the horizontal image sensor 28 are disposed on the center line of the shaft holder 25. The horizontal image sensor 28 is disposed at a focal position of the horizontal second condenser lens 27.

The horizontal angle detection pattern 23, the horizontal first condenser lens 24, the horizontal second condenser lens 27, and the horizontal image sensor 28 make up together a principal part of a horizontal rotation angle detecting apparatus 29 for detecting horizontal angle. It is so designed that the horizontal rotation angle detecting apparatus 29 detects rotation angle and an axial deviation of the horizontal rotation shaft 14 when the horizontal image sensor 28 detects the horizontal angle detection pattern 23 as projected on the horizontal image sensor 28, and also, when change of projected image due to the rotation of the horizontal rotation shaft 14 is detected. A magnifying power of the horizontal first condenser lens 24 and a magnifying power of the horizontal second condenser lens 27 is one respectively. By designing that a magnifying power of the horizontal first condenser lens 24 and a magnifying power of the horizontal second condenser lens 27 is one respectively, it is so arranged that the horizontal angle detection pattern 23 and the horizontal image sensor 28 are displaced at the condition of 1:1.

On the telescope unit 8, a vertical rotation shaft 21 which is extending in horizontal direction from left end and right end, is disposed. The vertical rotation shaft 21 is supported by the housing 16 via a bearing 32, and the telescope unit 8 can be rotated in vertical direction with the vertical rotation shaft 21 as a center.

On one end of the vertical rotation shaft 21, a vertical rotation gear 33 is fixedly attached, and a vertical rotation driving gear 34 is engaged with the vertical rotation gear 33. The vertical rotation driving gear 34 is fixedly attached to an output shaft of a vertical rotation motor 35, and when the vertical rotation motor 35 is driven, the telescope unit 8 is rotated around the vertical rotation shaft 21 via the vertical rotation driving gear 34 and the vertical rotation gear 33.

On the other end of the vertical rotation shaft 21, a second shaft space 36 concentric to the vertical rotation shaft 21 is formed. A vertical angle detection pattern 37 and a vertical first condenser lens 38 are accommodated in the second shaft space 36, and the vertical angle detection pattern 37 and the vertical first condenser lens 38 are disposed on the center line of the vertical rotation shaft 21. The vertical angle detection pattern 37 is disposed at a focal position of the vertical first condenser lens 38.

A holder support 39 in cylindrical shape and concentric to the other end of the vertical rotation shaft 21 is projected toward inside, and a shaft holder 41 is fitted and engaged on a forward end of the holder support 39. On the axial holder 41, a bearing unit space 42 concentric to the vertical rotation shaft 21 is disposed, and a vertical second condenser lens 43 and a vertical image sensor 44 are accommodated in the bearing unit space 42. The vertical second condenser lens 43 and the vertical image sensor 44 are disposed on center line of the vertical rotation shaft 21. Also, the vertical image sensor 44 is disposed at a focal position of the vertical second condenser lens 43.

The vertical angle detection pattern 37, the vertical first condenser lens 38, the vertical second condenser lens 43 and the vertical image sensor 44 make up together a principal part of a vertical rotation angle detecting apparatus 45 for detecting the vertical angle (elevation angle). It is so designed that the vertical rotation angle detecting apparatus 45 can detect rotation angle and an axial deviation of the vertical rotation shaft 21 when the vertical image sensor 44 detects the vertical angle detection pattern 37 projected on the vertical image sensor 44 and when change of the projected image associated with rotation of the vertical rotation shaft 21 is detected. Each of the vertical first condenser lens 38 and the vertical second condenser lens 43 has a magnifying power of 1 respectively, and by the fact that each of the vertical first condenser lens 38 and the vertical second condenser lens 43 has a magnifying power of 1 respectively, it is so arranged that the vertical angle detection pattern 37 and the vertical image sensor 44 are displaced at a condition of 1:1.

On an upper surface of the telescope unit 8, an attachment device 46 is fixed by machine screws or the like, and the electronic distance measuring instrument 3 serving as a distance measuring instrument is mounted on the attachment device 46, and the electronic distance measuring instrument 3 is designed to be integrally rotated with the telescope unit 8.

The electronic distance measuring instrument 3 is so arranged that a distance measuring light is emitted from a distance measuring light emitting unit (not shown), and by receiving and detecting a reflection light reflected from the object to be measured by a distance measuring light detecting unit (not shown), distance is measured according to the reflection light thus detected. The attachment device 46 has a distance measuring light projecting orifice (not shown) on a forward surface and has a distance measuring light detecting orifice 48 adjacent to the distance measuring light projecting orifice, and it is so arranged that, when the electronic distance measuring instrument 3 is mounted, the distance measuring light as emitted from the distance measuring light emitting unit passes through the distance measuring light projecting orifice and the reflection light reflected from the object to be measured passes through the distance measuring light detecting orifice 48.

On a front surface of the attachment device 46, a prism holder 51 is fixedly attached by screws 49, and a rhombic prism 52 is held by the prism holder 51. The rhombic prism 52 is mounted so as to cover the distance measuring light projecting orifice and the center of front surface of the telescope unit 8. The distance measuring light projecting orifice is arranged at a position displaced leftward from the center line of the horizontal rotation shaft 14 of the telescope unit 8 with respect to paper surface, and the rhombic prism 52 is tilted with respect to the vertical line.

The rhombic prism 52 has two reflection surfaces each on an upper end and at a lower end respectively. It is arranged so that the distance measuring light emitted from the electronic distance measuring instrument 3 is deflected downward so as to perpendicularly cross the sighting optical axis of the telescope 8 by the reflection surface of the upper end, and then, the distance measuring light is deflected on reflection surface of the lower end in parallel direction so as to concur with the sighting optical axis of the telescope unit 8.

Now, by referring to FIG. 3 to FIG. 6, detailed description will be given on the attachment device 46.

Figure 3:
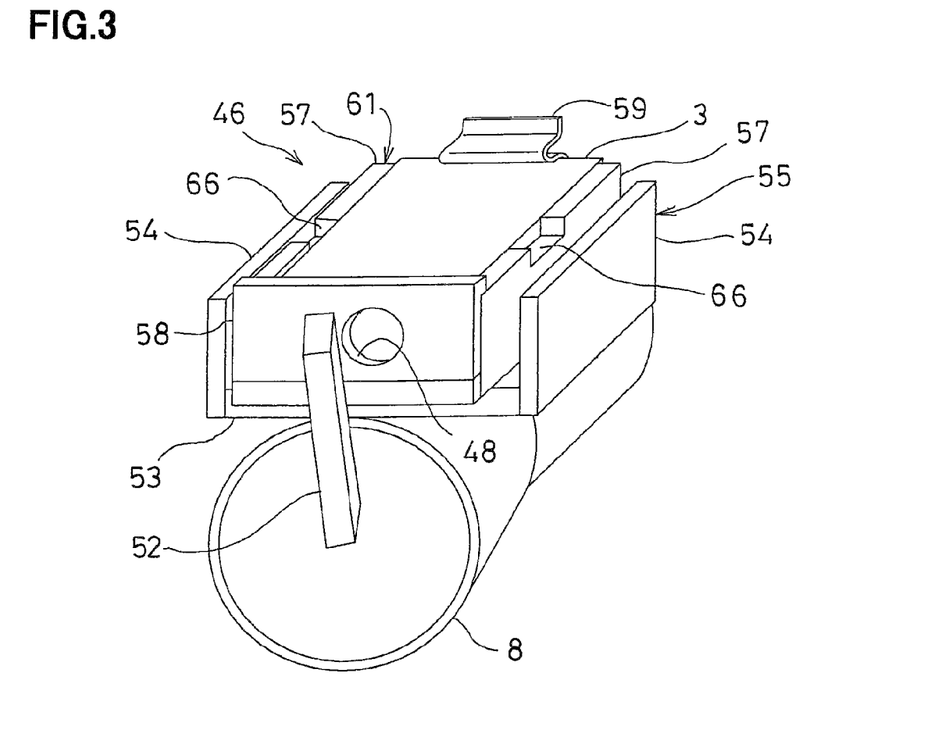
FIG. 3 is a schematical perspective view to show a condition where an electronic distance measuring instrument is mounted on a theodolite of the total station via an attachment device.
Figure 4:
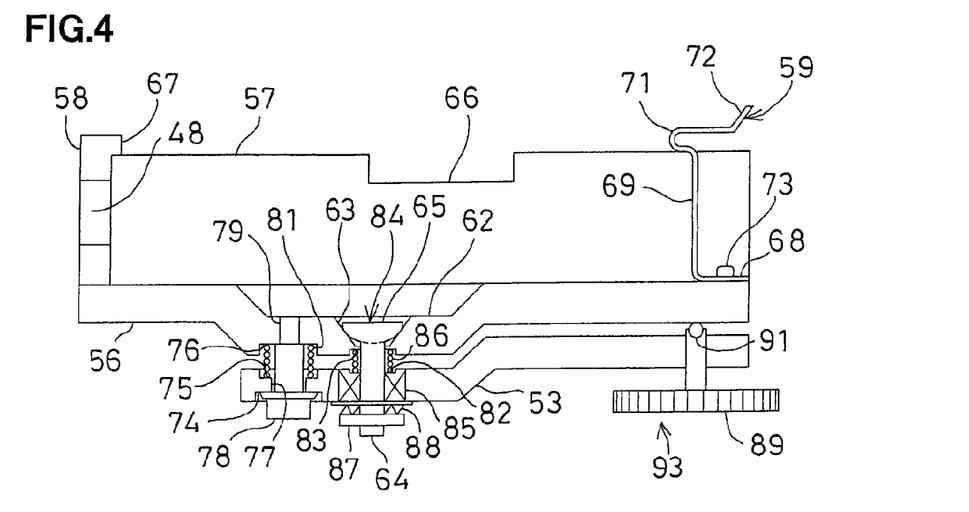
FIG. 4 is a schematical lateral cross-sectional view of the attachment device.

The attachment device 46 comprises an outer case 55 having an outer bottom plate 53 and outer lateral plates 54 and 54, and an inner case 61 having an inner bottom plate 56 and inner lateral plates 57 and 57, and further, having an inner front plate 58 and a fixed member 59 in form of a flat spring and tiltable in front and rear directions. The electronic distance measuring instrument 3 is accommodated in the inner case 61, which serves as a base unit.

First, the inner case 61 will be described. At a central part in longitudinal direction of the inner bottom plate 56, a recessed portion 62 with cross-section of inverted trapezoidal shape is formed to cover total length in width direction. On the recessed portion 62, an inverted trapezoidal groove 63 having the cross-section of inverted trapezoidal shape is formed over total length in width direction of the recessed portion 62. A through-hole (not shown) is prepared at the center of the inverted trapezoidal groove 63, and a pivot shaft 64 to be described later is passed into the through-hole. On upper end of the pivot shaft 64, a head piece 65 perpendicularly crossing a center line of the pivot shaft 64 and extending in horizontal direction is prepared. A lower surface of the head piece 65 is designed in semi-cylindrical shape having a semi-cylindrical surface, and the head piece 65 is attached and engaged with the inverted trapezoidal groove 63. The pivot shaft 64 and the head piece 65 make up together a shaft unit 84, which has a two-axis rotation shaft.

At the center of the inner lateral plates 57 and 57, cutaway portions 66 and 66 are formed from upper end, and it is so arranged that the electronic distance measuring instrument 3 accommodated in the inner case 61 can be gripped by an operator through the cutaway portions 66 and 66. On upper portion of the inner front plate 58, an engaging projection 67 is formed over the entire width, and the engaging projection 67 protrudes in form of an eave toward inner portion of the inner case 61. The engaging projection 67 stops and fastens front end of the electronic distance measuring instrument 3 when the distance measuring instrument 3 is accommodated in the inner case 61.

The fixing member 59 is a metal thin plate such as a stainless steel plate having property of a spring or other plates, and the fixing member 59 comprises, a fixed piece 68 running in parallel to upper surface of the inner bottom plate 56, a holding piece 69 being bent vertically or approximately vertical with respect to the fixed piece 68, a fall-stop piece 71, which is prepared by bending at 180° in U-shaped form after being bent perpendicularly toward inner side of the inner case 61 from upper end of the holding piece 69, and a knob piece 72, which is formed by bending a forward end of the fall-stop piece 71 in diagonal upward direction. The fixed member 59 is mounted on rear end of the inner bottom plate 56 via the fixed piece 68 by a fixing tool 73 such as a bolt or the like. The holding piece 69 is preferably designed as tilted toward inner side so that the holding piece 69 can hold the electronic distance measuring instrument 3.

The height of the holding piece 69 is designed to be at a same height or to be slightly higher than the height of the electronic distance measuring instrument 3 to be accommodated in the inner case 61. By pressing the knob piece 72 diagonally in downward direction, the knob piece 72 can be tilted in backward direction with lower end of the holding piece 69 as a supporting point by elastic deformation of the fixed member 59.

Next, the outer case 55 is described. The outer case 55 has its length in longitudinal direction shorter than the inner case 61.

The outer bottom plate 53 is running in parallel to the inner bottom plate 56. On lower surface and upper surface of the outer bottom plate 53, counterbores 74 and 75 are formed concentrically to each other, and on lower surface of the inner bottom plate 56 at a position opposite to the counterbore 75, a counterbore 76 is formed concentrically to the counterbore 75.

At the center of each of the counterbores 74 and 75, a hole 77 passing through the outer bottom plate 53 is formed, and a fixed screw 78 is passed through the hole 77 via washer from below. A forward end of the fixed screw 78 is designed with smaller diameter, and the forward end serves as a screw piece 79. The screw piece 79 is screwed into the inner bottom plate 56, and the fixed screw 78 is fixedly attached to the inner bottom plate 56. Contact surface of a head of the fixed screw 78 with the washer may be designed to have a spherical surface.

A compression coil spring 81 is fitted and engaged with the fixed screw 78, and upper end and lower end of the compression coil spring 81 are accommodated in the counterbores 75 and 76 respectively. The compression coil spring 81 is arranged in compressed state, and the inner case 61 is biased in upward direction by the compression coil spring 81. Diameter of the hole 77 is designed to be sufficiently larger than outer diameter of the fixed screw 78 so that the fixed screw 78 can be displaced within the hole 77 to follow the displacement of the inner case 61.

The pivot shaft 64 passes through the outer bottom plate 53 and is protruded in downward direction, and a counterbore 82 and a counterbore 83 are formed with a through-hole as the center respectively on the upper surface of the outer bottom plate 53 and on lower surface of the inner bottom plate 56.

The pivot shaft 64 is attached and engaged with the outer bottom plate 53 via a bearing 85, and the pivot shaft 64 is freely rotatable with respect to the outer bottom plate 53.

A compression coil spring 86 is fitted and engaged with the pivot shaft 64, and when the lower end and the upper end of the compression coil spring 86 are attached and engaged with the counterbores 82 and 83, the compression coil spring 86 is placed in compressed condition between the outer bottom plate 53 and the inner bottom plate 56. By resilient force of the compression coil spring 86, the outer bottom plate 53 and the inner bottom plate 56 are biased so as to be separated from each other, and semi-cylindrical surface of the head piece 65 is closely fitted in the inverted trapezoidal groove 63, and the inner bottom plate 56 is designed to be tiltable only within the surface, which perpendicularly crosses the a shaft center of the head piece 65. A portion of the pivot shaft 64, which is protruded from lower surface of the outer bottom plate 53, a retaining ring 87 is fitted and engaged, and a spring seat 88 is placed between the retaining ring 87 and the lower surface of the outer bottom plate 53. By the spring seat 88, shakiness between the pivot shaft 64 and the outer bottom plate 53 and between the pivot shaft 64 and the inner bottom plate 56 can be suppressed.

Figure 6:
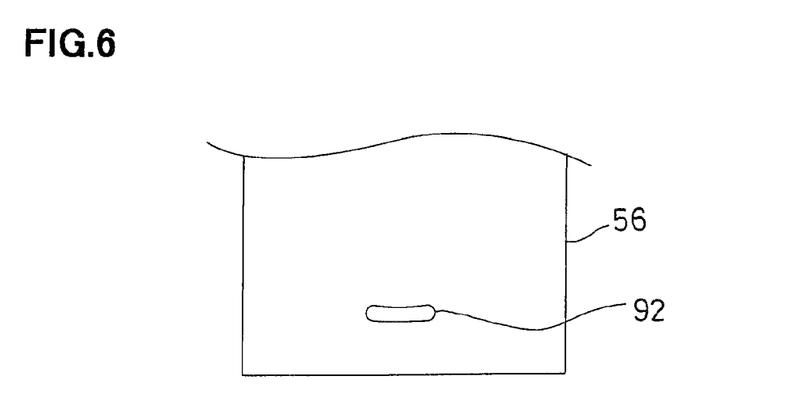
FIG. 6 is a schematical rear view to show a rear end of a lower surface of an inner case of the attachment device.

At rear end of the outer bottom plate 53, a knurling screw 89 passing through the outer bottom plate 53 from downward direction is screwed in. At a forward end of the knurling screw 89, a contact member 91 in a spherical shape and made of synthetic resin or the like is provided at the forward end of the knurling screw 89 so that the contact member 91 comes into contact with lower surface of the inner bottom plate 56. A contact groove 92 is formed on lower surface of the inner bottom plate 56, to which the contact member 91 is brought into contact, and a member with lower friction resistance, being made of synthetic resin or the like, is fitted and engaged in the contact groove 92. The contact groove 92 is designed as a groove in form of an arc, having the same shape as locus when the contact member 91 is rotated around the pivot shaft 64 so that the knurling screw 89 and the inner bottom plate 56 are not worn down when the contact member 91 and the contact groove 92 come into contact slidingly with each other.

The pivot shaft 64, the fixed screw 78, and the knurling screw 89 make up together an elevation angle adjusting means 93, and by rotating the knurling screw 89, the inner case 61 is rotated in vertical direction with the center line of the head piece 65 of the pivot shaft 64 as the center.

Figure 5:
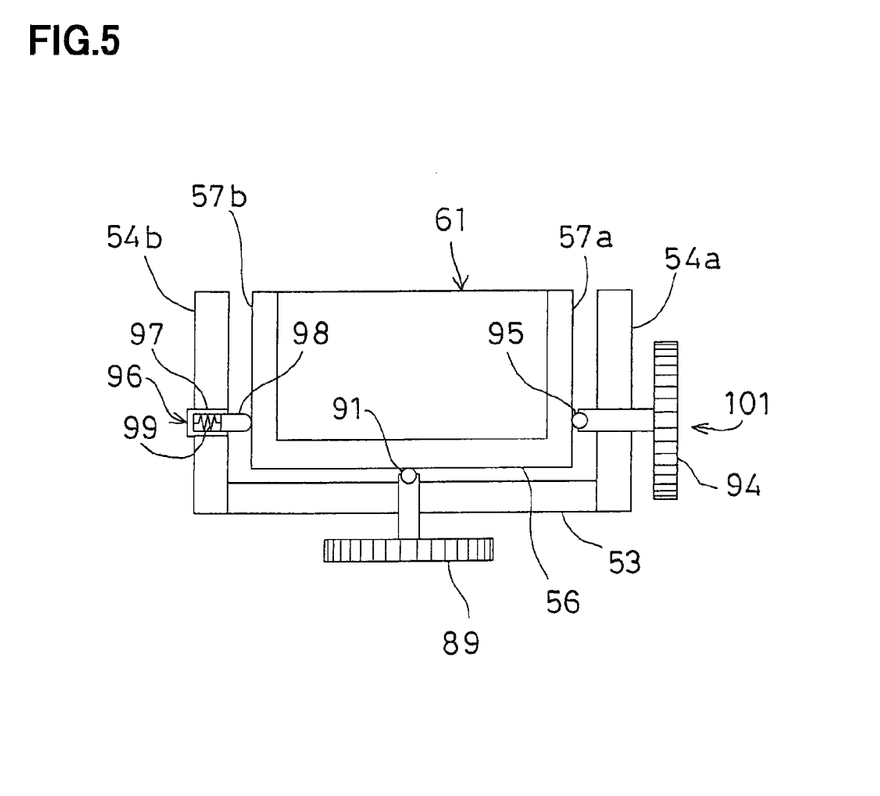
FIG. 5 is a schematical frontal cross-sectional view to show a rear end portion of the attachment device.

At rear end of one of the outer lateral plates (i.e. an outer lateral plate 54a), a knurling screw 94 passing through the outer lateral plate 54a from a lateral direction is screwed in. At a forward end of the knurling screw 94, a contact member 95 in spherical shape and made of synthetic resin or the like is provided so that the contact member 95 comes into slidingly contact with a side surface of one of the inner lateral plates (i.e. an inner lateral plate 57a).

On rear end of other outer lateral plates (i.e. an outer lateral plate 54b) at a position opposite to the knurling screw 94, a pressing unit 96 passing through the other outer lateral plate 54b from a lateral direction is provided. The pressing unit 96 is disposed on a shaft center line of the knurling screw 94. The pressing unit 96 has a tube piece 97, which has an opened surface at a position opposite to an other inner lateral plate 57b, and a floater 98 is slidably engaged with the tube piece 97. A forward end of the floater 98 is designed as spherical surface, and the floater 98 is made of a material such as synthetic resin or the like. A spring 99 is accommodated in the tube piece 97 and is positioned in compressed state between the floater 98 and the tube piece 97, the spring 99 presses the floater 98 toward the inner lateral plate 57b. Therefore, by the biasing force of the spring 99, the one of the inner lateral plate 57b is pushed toward the contact member 95.

The pivot shaft 64, the knurling screw 94, and the pressing unit 96 make up together a horizontal angle adjusting means 101. When the knurling screw 94 is rotated, the contact member 95 is displaced in horizontal direction, and the inner case 61 corresponds to the displacement of the contact member 95. Also, the floater 98 is moved in or out by following the horizontal displacement of the inner case 61, and shakiness of the inner case 61 can be suppressed. By the horizontal angle adjusting means 101, it is so designed that the inner case 61 is rotated in horizontal direction.

The elevation angle adjusting means 93 and the horizontal angle adjusting means 101 make up together a mechanical alignment unit, which is an alignment unit of the attachment device 46.

Although it is not shown in the figure, a plurality of holes passing through the outer bottom plate 53 and the inner bottom plate 56 are formed on the outer case 55 and the inner case 61, and the attachment device 46 can be fixed on the telescope unit 8 by machine screws through these holes. In this case, screw holes for fixing a foresight and a backlight as provided on upper surface of the telescope unit 8 in advance may be used as the screws for fixing by machine screws, or screw holes may be prepared newly. In this case, the outer case 55 fulfills the function as a fixing tool for fixing the inner case 61 (i.e. base unit) on the theodolite 2.

Or, a counterbore may be formed in the through-hole for a screw so that the heads of the screw does not interfere with the electronic distance measuring instrument 3. It is preferable that a spacer or the like is provided between the attachment device 46, i.e. the outer bottom plate 53, and the telescope unit 8, so that the fixing screws 78 and the pivot shafts 64 protruding from the outer bottom plate 53 in downward direction may not cause trouble in a case where the attachment device 46 is mounted on the telescope unit 8.

Next, description will be given on a case where surveying operation is carried out by using the total station 1.

First, the electronic distance measuring instrument 3 is mounted on the attachment device 46. The electronic distance measuring instrument 3 is tilted and a forward end portion is placed between the engaging projection 67 and the inner bottom plate 56 of the inner front plate 58. Then, by tilting the fixed member 59 in rearward direction while holding the knob piece 72 of the fixing member 59, the rear end of the electronic distance measuring instrument 3 is engaged into the holding piece 69. By taking the hand off the knob piece 72, the rear end of the electronic distance measuring instrument 3 is fixed by the fall-stop 71, and the electronic distance measuring instrument 3 is mounted on the attachment device 46. That is, the electronic distance measuring instrument 3 is mounted on the theodolite 2 via the attachment device 46, and the total station 1 can be made up.

Next, leveling is performed on the total station 1 by the leveling screws 5. After the leveling has been completed, the total station 1 is set up as a reference position.

Then, sighting is performed on the object to be measured by using the telescope unit 8. On the telescope unit 8, an index mark such as a cross or the like is marked so that sighting optical axis can be identified when sighting is performed on the object to be measured by the operator. By aligning the index mark on the object to be measured or a measuring point, sighting can be performed. The operation of sighting can be carried out by driving the horizontal rotation motor 19 and the vertical rotation motor 35.

The horizontal rotation motor 19 is driven and the housing 16 is rotated in horizontal direction. Horizontal rotation angle of the housing 16 can be detected by the horizontal rotation angle detecting apparatus 29. An axial deviation (axial tilting) of the rotation shaft can be simultaneously detected by the horizontal rotation angle detecting apparatus 29, and based on the axial deviation thus detected, the horizontal angle detected by the horizontal rotation angle detecting apparatus 29 can be corrected.

The vertical rotation motor 35 is driven, and the telescope unit 8 and the electronic distance measuring instrument 3 are rotated in vertical direction. Vertical rotation angle of the telescope unit 8 and the electronic distance measuring instrument 3 can be detected by the vertical rotation angle detecting apparatus 45, and the axial deviation of the vertical rotation shaft 21 can be detected at the same time. Similarly, based on the axial deviation thus detected, the vertical angle detected by the vertical rotation angle detecting apparatus 45 can be corrected.

When the sighting of the telescope unit 8 is completed, a distance measuring light is emitted from the distance measuring light emitter (not shown) of the electronic distance measuring instrument 3. The distance measuring light enters to the rhombic prism 52 and is deflected by the rhombic prism 52 and is projected. The deflecting condition of the distance measuring light deflected by the rhombic prism 52 is adjusted by using the elevation angle adjusting means 93 and the horizontal angle adjusting means 101 so that the optical axis concurs with the sighting optical axis of the telescope unit 8.

In a case where the distance measuring light projected by the electronic distance measuring instrument 3 is a visible light such as infrared light or the like, the operator can perform adjustment by using the telescope unit 8 so that a center of the index mark showing the sighting optical axis concurs with the projected distance measuring light.

By rotating the knurling screw 89, the inner case 61 and the electronic distance measuring instrument 3 fixed in the inner case 61 is rotated and displaced with the head piece 65 as a center and an elevation angle of the inner case 61 and the electronic distance measuring instrument 3 is adjusted.

In this case, the inner case 61 is biased in upward direction by the compression coil spring 81. As a result, contacting condition between the contact member 91 and the contact groove 92 is maintained, and the electronic distance measuring instrument 3 is fixed under the condition where the elevation angle is adjusted.

By rotating the knurling screw 94, the inner case 61 and the electronic distance measuring instrument 3, being pressed by the contact member 95 or the floater 98, are rotated and displaced around the pivot axis 64, and horizontal angles of the inner case 61 and the electronic distance measuring instrument 3 can be adjusted.

In this case, the inner case 61 is pressed by the floater 98 under the condition that the inner case 61 is in contact with the contact member 95, and the inner case 61 is squeezed by the knurling screw 94 and the pressing unit 96, and the electronic distance measuring instrument 3 is fixed under the condition that the horizontal angle is adjusted.

By adjusting elevation angle and horizontal angle of the electronic distance measuring instrument 3 and by aligning the distance measuring optical axis and the sighting optical axis, the distance measuring light is projected from the electronic distance measuring instrument 3 along the sighting optical axis through the distance measuring light projecting orifice. The distance measuring light thus projected is deflected by the rhombic prism 52 and is projected to the object to be measured while the distance measuring light concurs with the sighting optical axis of the telescope unit 8. Then, by receiving the reflection light reflected by the object to be measured through the distance measuring light detecting orifice 48, a distance to the object to be measured is determined. At the same time, a horizontal angle and an elevation angle are measured by the horizontal rotation angle detecting apparatus 29 and the vertical rotation angle detecting apparatus 45.

As described above, according to the first embodiment, the total station 1 can be arranged by mounting the electronic distance measuring instrument 3 available at relatively lower cost in the market via the attachment device 46 on the existing theodolite 2. Therefore, the total station is cheaper than an integrated type total station, which has distance measuring function and angle measuring function, a manufacturing cost is low.

The attachment device 46 as described above has a simple construction arrangement by combining the outer case 55 and the inner case 61, and the manufacturing cost is low.

When the electronic distance measuring instrument 3 is mounted on the attachment device 46, it is enough that under the condition that the fixing member 59 is tilted in rearward direction via the knob piece 72, the electronic distance measuring instrument 3 is engaged with the inner case 61 and after that, the fixing member 59 is returned. As a result, operation of the electronic distance measuring instrument 3 is simple, and attaching and removing of the electronic distance measuring instrument 3 on the attachment device 46 can be accomplished in easier manner.

The attachment device 46 has the mechanical alignment unit, which comprises the elevation angle adjusting means 93 and the horizontal angle adjusting means 101. As a result, fine adjustment of elevation angle and horizontal angle of the electronic distance measuring instrument 3 mounted on the attachment device 46 is possible, and errors caused in the manufacturing process of the attachment 46 or the like can be eliminated.

The rhombic prism 52 having two reflection surfaces is provided to cover from the distance measuring light projecting orifice (not shown) of the attachment device 46 to front surface of the telescope unit 8. As a result, the distance measuring light can be projected along the sighting optical axis by deflecting the distance measuring light projected from the electronic distance measuring instrument 3 and by making the distance measuring optical axis concur with the sighting optical axis of the telescope unit 8, and the measurement accuracy can be improved. In a case where the measurement is to be made on wall surface or the like, a deviation caused by a sighting position by the telescope unit 8 and a projecting position of the distance measuring light do not exert influence almost at all. Therefore, and the rhombic prism 52 may not be used.

Further, because the rhombic prism 52 is mounted with tilting with respect to the center line of the horizontal rotation shaft 14 of the telescope unit 8, the distance measuring light projecting orifice (not shown) may be relatively away from the center line of the horizontal rotation shaft 14. Therefore, the distance measuring light detecting orifice 48 where reflection light from the object to be measured passes through can be designed as close as possible to the distance measuring optical axis of the distance measuring light, which is deflected and projected by the rhombic prism 52. As a result, it is possible to shorten the optical path of the distance measuring optical axis, which is projected and reflected, and the measurement accuracy can be improved further.

In the first embodiment as described above, the rhombic prism 52 is used as the optical member having two reflection surfaces. However, the same effect can be obtained as the case of the rhombic prism 52 when a member combined with two mirrors is used. In a case where two reflection surfaces are used, optical axis can be preserved even when the optical member is deviated due to the change of the operating environment conditions (such as temperature, humidity, etc.) or due to external factors (such as impact, vibration, etc.). Therefore, it is desirable that the reflection is performed by two times, while it would suffice if the distance measuring light projected from the electronic distance measuring instrument 3 is deflected and the light is projected along the sighting optical axis so that the distance measuring optical axis concurs with the sighting optical axis of the telescope unit 8. For instance, an optical member having three or more reflection surfaces may be used.

By manufacturing a plurality of the attachment devices 46 in advance, which have different opening areas of the inner case 61 or different positions of the distance measuring light projecting orifice (not shown) and different positions of the distance measuring light receiving orifice 48, an electronic distance measuring instrument with different shape or the like may be mounted on the theodolite 2.

In the mechanical alignment unit in the first embodiment, it is arranged that the operator makes the distance measuring optical axis to be aligned to the sighting optical axis by manually operating the knurling screws 89 and 94, while it may be so arranged that the motor is engaged with the knurling screws 89 and 94 via a gear, and a camera is mounted on the same axis as the sighting optical axis. Further, by connecting electrically the motor and the camera to a control unit such PC or the like, the distance measuring optical axis and the sighting optical axis may be designed to concur with each other by automatically driving the motor through the procedure such as image processing or the like. Also, scaling may be provided as index mark so that amount of the change of optical axis due to the amount of rotation of the knurling screws 89 and 94 can be visually confirmed.

Also, in the first embodiment, the attachment device 46 is directly mounted on the telescope unit 8 of the theodolite 2, while it may be so arranged that the attachment device 46 is mounted on a housing (casing) where the telescope unit 8 is accommodated.

Figure 7:
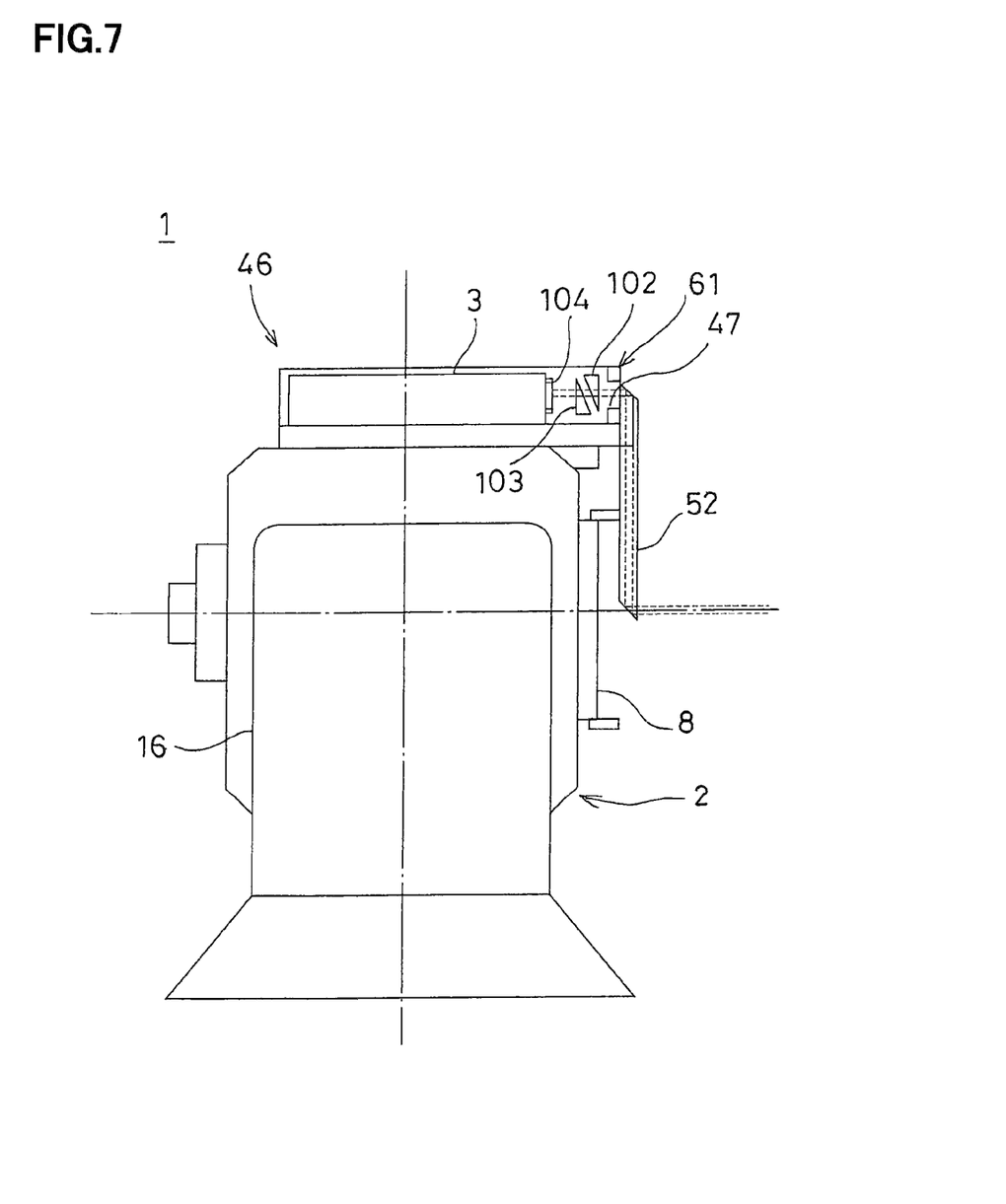
FIG. 7 is a schematical lateral cross-sectional view of a total station according to a second embodiment of the present invention.
Figure 8:
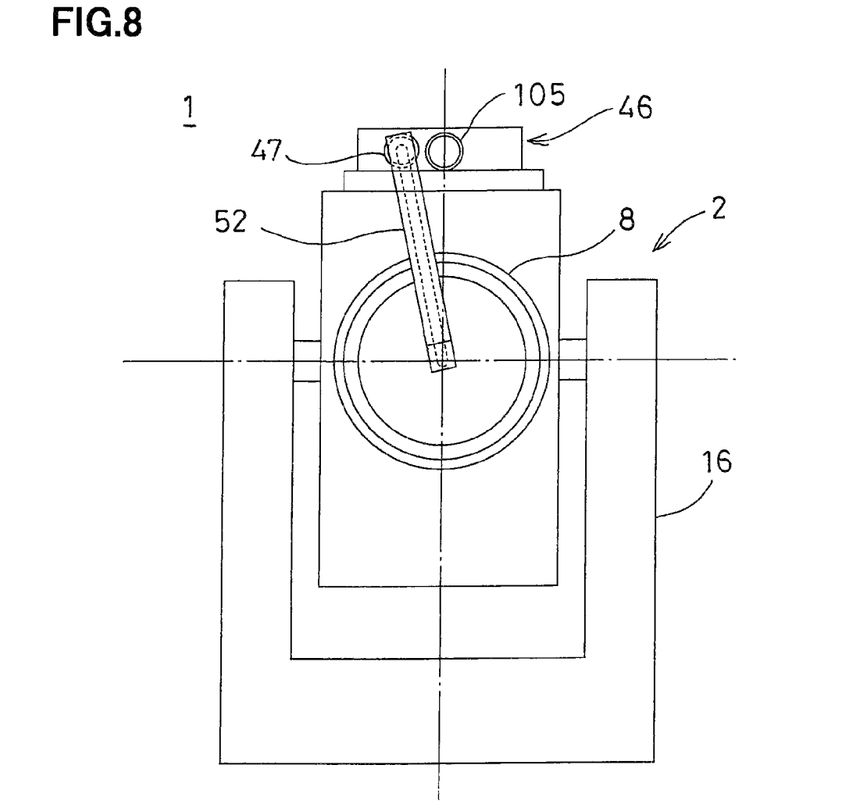
FIG. 8 is a schematical front view to show the total station of the second embodiment of the present invention.
Figure 9:
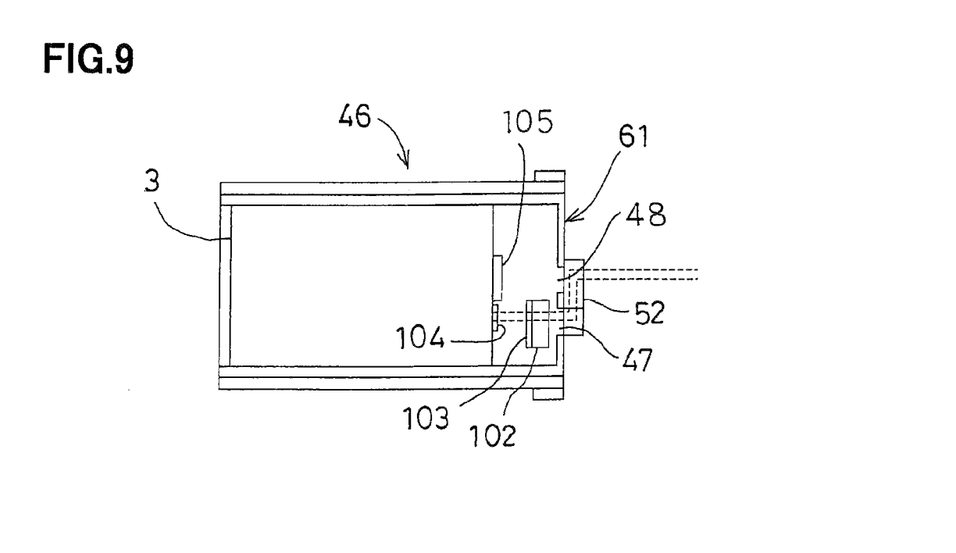
FIG. 9 is a schematical plan view to show a condition where an electronic distance measuring instrument is mounted on the attachment device in the second embodiment of the present invention.

Next, referring to FIG. 7 to FIG. 9, description will be given on a total station 1 in the second embodiment of the present invention. In FIG. 7 to FIG. 9, the same component as in FIG. 1 to FIG. 3 is referred by the same symbol, and detailed description is not given here.

In the second embodiment, an attachment device 46 mounted on a theodolite 2 has a pair of wedge prisms 102 and 103 further, and the wedge prisms 102 and 103 are rotatably supported respectively. The wedge prisms 102 and 103 are optical alignment units, which are alignment units of the attachment device 46.

The wedge prisms 102 and 103 have vertical angles as required. These wedge prisms 102 and 103 are arranged close to each other so that tilted surfaces are positioned opposite to each other between a distance measuring light projecting unit 104 of an electronic distance measuring instrument 3 mounted on the attachment device 46 and a distance measuring light projecting orifice 47 of an inner case 61, and it is so arranged that the distance measuring light projected from the distance measuring light projecting unit 104 passes through the wedge prisms 102 and 103 respectively.

The wedge prisms 102 and 103 can be separately rotated. By rotating the wedge prisms 102 and 103 separately from each other, the distance measuring light passing through the wedge prisms 102 and 103 can be deflected in any direction as desired within a predetermined range.

Now, description will be given on a case where distance measurement is performed by using the total station 1 in the second embodiment. The distance measuring light as projected from the distance measuring light projecting unit 104 of the electronic distance measuring instrument 3 is deflected in a process where the light passes through the wedge prisms 102 and 103 respectively, and the light enters a rhombic prism 52, which is an optical member having two reflection surfaces.

After being projected to the rhombic prism 52, the distance measuring light is deflected so as to concur with the sighting optical axis of a telescope unit 8. After being projected along the sighting optical axis, the light is projected to the object to be measured. The distance measuring light reflected by the object to be measured is received by a distance measuring light detecting unit 105 through a distance measuring light detecting orifice 48 (see FIG. 3), and a distance to the object to be measured is determined.

In order that the distance measuring light is set to concur with the sighting optical axis of the telescope unit 8 by the rhombic prism 52, the distance measuring light must be projected to the rhombic prism 52 in parallel to the sighting optical axis of the telescope unit 8. In the second embodiment, it is so arranged that the wedge prisms 102 and 103 are placed between the distance measuring light projecting unit 104 and the rhombic prism 52.

Therefore, even in a case where the distance measuring light is projected in a direction not in parallel to the sighting optical axis of the telescope unit 8 in a stage when the light is projected from the distance measuring light projecting unit 104, the wedge prisms 102 and 103 are rotated respectively and the distance measuring light is deflected. Thus, it is possible to project the distance measuring light in parallel to the sighting optical axis of the telescope unit 8. As a result, it is possible to eliminated a deviation of a direction of the electronic distance measuring instrument 3 when the electronic distance measuring instrument 3 is mounted on the attachment device 46.

As described above, in the attachment device 46 according to the second embodiment, instead of a mechanical alignment unit having an elevation angle adjusting means 93 (see FIG. 4) and a horizontal angle adjusting means 101 (see FIG. 5), an optical alignment unit having the wedge prisms 102 and 103 is provided. As a result, it is possible to perform fine adjustment of elevation angle and horizontal angle of the electronic distance measuring instrument 3 mounted on the attachment device 46. Also, by combining the first embodiment with the second embodiment, the direction of the distance measuring light to be projected to the rhombic prism 52 can be finely adjusted, and errors caused during the manufacturing process of the attachment device 46 or the like can be eliminated more.

The invention claimed is:

1. An attachment device for attaching and removing a distance measuring instrument to and from an angle measuring instrument, wherein said attachment device comprises:
   a base unit where said distance measuring instrument is fixed,
   a fixing unit for fixing said base unit on said angle measuring instrument, and
   an optical member for deflecting a distance measuring light from said distance measuring instrument so as to concur with a sighting optical axis of said angle measuring instrument.

2. An attachment device according to claim 1, wherein said optical member is an optical member having at least two reflection surfaces.

3. An attachment device according to claim 1 or 2, further comprising an alignment unit to perform alignment so that said distance measuring light concurs with the sighting optical axis of said angle measuring instrument.

4. An attachment device according to claim 3, wherein said alignment unit has a mechanical alignment unit for aligning by rotating said distance measuring instrument around a shaft unit having two-axis rotation shafts in horizontal direction and in vertical direction.

5. An attachment device according to claim 3, wherein said alignment unit has an optical alignment unit comprising a pair of wedge prisms capable of deflecting said distance measuring light in any direction as desired in a predetermined range.

6. An attachment device according to claim 1, further comprising an index mark for making an optical axis of said distance measuring light concur with the sighting optical axis of said angle measuring instrument.

7. An attachment device according to claim 1, wherein said base unit has an engaging projection being formed to project in inner direction and for fastening a front end of said distance measuring instrument at an upper end of a front plate having a distance measuring light projecting orifice and a distance measuring light receiving orifice, and a fixing member having a fall-stop to be moved in forward or backward direction and for fixing a rear end of said distance measuring instrument.

8. A total station, comprising:
a distance measuring instrument for projecting a distance measuring light toward an object to be measured and for measuring a distance by receiving a reflection light from said object to be measured,
an angle measuring instrument for measuring an angle relating to a direction of said object to be measured by performing sighting on said object to be measured by a telescope unit, and
an attachment device for attaching and removing said distance measuring instrument to and from said angle measuring instrument,
wherein said attachment device has an optical member for deflecting said distance measuring light from said distance measuring instrument so as to concur with a sighting optical axis of said angle measuring instrument.

9. A total station according to claim 8, wherein said optical member is an optical member having at least two reflection surfaces.

10. A total station according to claim 8 or 9, further comprising an alignment unit for making said distance measuring light concur with the sighting optical axis of said angle measuring instrument.

11. A total station according to claim 10, wherein said alignment unit has a mechanical alignment unit for performing alignment by rotating said distance measuring instrument in horizontal direction and in vertical direction around a shaft unit having 2-axis rotation shafts.

12. A total station according to claim 10, wherein said alignment unit has an optical alignment unit having a pair of wedge prisms which can deflect said distance measuring light in any direction as desired within a predetermined range.

13. A total station according to claim 8, further comprising a control unit, wherein said control unit makes an optical axis of said distance measuring light automatically concur with the sighting optical axis of said angle measuring instrument.

* * * * *